(12) United States Patent
Kahrger et al.

(10) Patent No.: US 10,486,910 B2
(45) Date of Patent: Nov. 26, 2019

(54) CONVEYOR BELT SYSTEM AND SYSTEM FOR MONITORING THE ROLLS OF THE CONVEYOR BELT SYSTEM

(71) Applicant: TAKRAF GmbH, Leipzig (DE)

(72) Inventors: Rainer Kahrger, Leipzig (DE); Mario Dilefeld, Leipzig (DE); Jan Nowak, Leipzig (DE)

(73) Assignee: TAKRAF GmbH, Leipzig (DE)

( * ) Notice: Subject to any disclaimer, the term of this patent is extended or adjusted under 35 U.S.C. 154(b) by 0 days.

(21) Appl. No.: 15/995,038

(22) Filed: May 31, 2018

(65) Prior Publication Data
US 2018/0346253 A1 Dec. 6, 2018

(30) Foreign Application Priority Data

Jun. 1, 2017 (DE) .......................... 10 2017 209 310

(51) Int. Cl.
*B65G 21/08* (2006.01)
*B65G 23/12* (2006.01)
(Continued)

(52) U.S. Cl.
CPC .............. *B65G 23/12* (2013.01); *B65G 13/11* (2013.01); *B65G 21/08* (2013.01); *B65G 39/12* (2013.01);
(Continued)

(58) Field of Classification Search
None
See application file for complete search history.

(56) References Cited

U.S. PATENT DOCUMENTS

| 3,147,852 A * | 9/1964 | Hanson, Jr. ............ | B65G 15/08 198/860.5 |
| 7,839,294 B2 * | 11/2010 | Orlowski ............... | B65G 39/09 340/679 |
| 2012/0186613 A1 | 7/2012 | Siegmund | |

FOREIGN PATENT DOCUMENTS

CN 107 720 112 A 2/2018
DE 29 11 186 A1 10/1980
(Continued)

OTHER PUBLICATIONS

German Patent Office, Examination Report issued in the German counterpart application DE 10 2017 209 310.2, dated Feb. 20, 2018.
(Continued)

*Primary Examiner* — Kavel Singh
(74) *Attorney, Agent, or Firm* — FisherBroyles, LLP; Andrew K. Gonsalves, Esq.

(57) ABSTRACT

The present invention relates to a conveyor belt system with a circulating conveyor belt, in which a loadable conveyor belt segment rests on upper rolls and an unloaded conveyor belt segment rests on lower rolls, and in which an enclosure extending along the longitudinal axis of the conveyor belt system. The invention also relates to a system for monitoring the rolls in this conveyor belt system. A task of the invention is to propose a conveyor belt system in which the detection of defective rolls is facilitated. The task is solved by way of a conveyor belt system in which the enclosure features diagnostic windows on at least one side of the conveyor belt, such that the diagnostic windows are arranged at the level of the rolls of the conveyor belt and are designed for optical and/or acoustic monitoring of the bearings of the rolls, by being either transparent to diagnostic signals, or easily openable.

18 Claims, 1 Drawing Sheet

Figure 1:
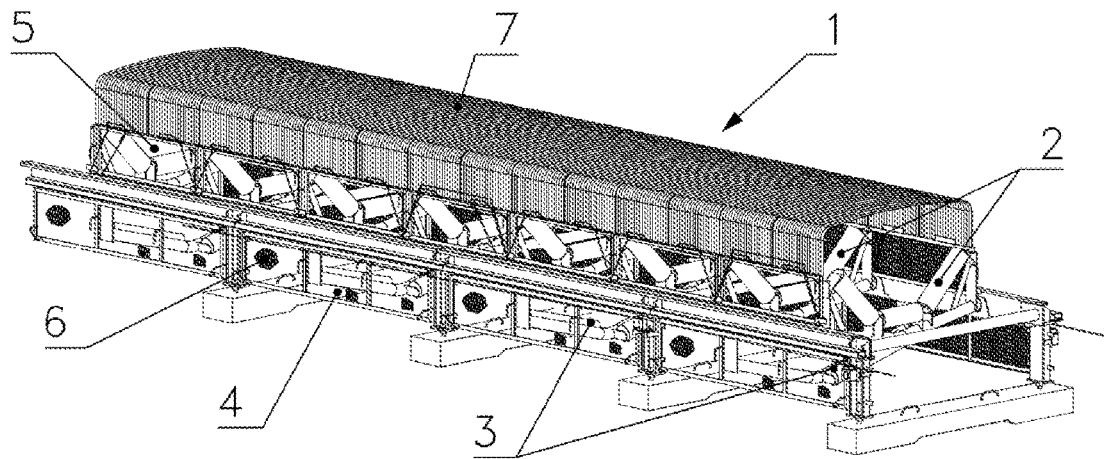

(51) Int. Cl.
*B65G 13/11* (2006.01)
*B65G 39/12* (2006.01)
*B65G 39/20* (2006.01)

(52) U.S. Cl.
CPC ........ *B65G 39/20* (2013.01); *B65G 2203/044* (2013.01)

(56) References Cited

FOREIGN PATENT DOCUMENTS

| | | |
|---|---|---|
| DE | 35 10 802 A1 | 10/1986 |
| DE | 297 21 744 U1 | 4/1998 |
| FR | 1 520 477 A | 4/1968 |
| JP | H08026441 A | 1/1996 |
| JP | H10300426 A | 11/1998 |
| KR | 101 764 066 B1 | 8/2017 |
| KR | 101 773 866 B1 | 9/2017 |
| WO | 2011160652 A1 | 12/2011 |

OTHER PUBLICATIONS

European Patent Office, Extended Examination Report issued in the European counterpart application EP 18174073.9, dated Nov. 2, 2018.

Chilean Patent Office, Examination Report issued in the Chilean counterpart application CL 201801450, dated May 30, 2018.

\* cited by examiner

CONVEYOR BELT SYSTEM AND SYSTEM FOR MONITORING THE ROLLS OF THE CONVEYOR BELT SYSTEM

The present invention relates to a conveyor belt system with a circulating conveyor belt, in which a loadable conveyor belt segment rests on upper rolls and an unloaded conveyor belt segment rests on lower rolls, and in which an enclosure extending along the longitudinal axis of the conveyor belt system. The invention also relates to a system for monitoring the rolls in this conveyor belt system.

Such conveyor belt systems are used in open pit mines, for instance, to transport extracted raw materials over distances of hundreds of meters long to loading stations. The conveyor belt systems regularly feature enclosures that prevent the dust from being blown from the conveyor belt and prevent the transported dry bulk from being moistened by rain. The enclosure is also needed for safety reasons in order to protect persons and animals from being injured by the moving parts of the conveyor belt system.

The conveyor belt systems feature a plurality of mounted rolls with a limited service life. Defective bearings may cause damage to the conveyor belt. Friction caused by sluggish bearings, as well as friction between the conveyor belt and a roll that does not rotate at a sufficient speed, generate heat. This may lead to high temperatures, and therefore, to a risk of fire resulting from the ignition of lubricants or of the conveyor belt itself. In order to avoid damage, conveyor belt systems are regularly inspected, and worn-out rolls are replaced in a timely manner, before they fail. Worn-out rolls may be detected in various ways, for instance acoustically, based on increased operating noises, or optically, by means of infrared thermometers or thermal imaging cameras.

From DE 203 19 532 U1, enclosures in the form of arched corrugated iron tunnels are known. These enclosures feature movable lifting hatches, by way of which the conveyor belt system can be monitored. The enclosure of the conveyor belt system obstructs the monitoring of the rolls, since the hatches or doors must always be opened first. Rolls that are not arranged immediately in front of an open door are harder to monitor, which involves the risk that smaller damage remains undetected. DE 36 22 702 C2 describes tunnel-shaped conveyor belt covers that feature segments of cover sheets. These sheet segments are laterally adjacent to each other, such that essentially, all locations on the side of a conveyor belt can be successively inspected after opening the cover sheets. With this type of enclosures, the opening for the purpose of inspection is still elaborate.

A disadvantage of flexible sheets is their limited resistance to ultra-violet radiation in case of intensive sun light and a resulting limited service life the sheets.

The task of the present invention is to propose a conveyor belt system in which the detection of defective rolls is facilitated. The task of the invention also includes proposing a system for monitoring the rolls of a conveyor belt system that does not have the aforementioned disadvantages of prior art systems.

The task of the invention is solved by way of a conveyor belt system in which the enclosure features diagnostic windows on at least one side of the conveyor belt, such that the diagnostic windows are arranged at the level of the rolls of the conveyor belt and are designed for optical and/or acoustic monitoring of the bearings of the rolls, by being either transparent to diagnostic signals, or easily openable.

These enclosures do not have to be opened on a large scale in order to perform the monitoring actions. Instead, the rolls ae inspected through diagnostic windows. In some embodiments of the invention, the windows remain closed for inspection, and inspection is done through the closed diagnostic windows. In other embodiments of the invention, only the relatively small diagnostic windows are opened in order to perform the inspections. Monitoring may be based on human senses, for instance by listening to the operating noises or by feeling the enclosure temperatures. In addition or alternatively, measuring instruments may be used, such as microphones with downstream signal analysis, infrared thermometers, or thermal imaging cameras. Measuring instruments may allow for reaching a greater degree of precision. Furthermore, performed diagnoses are easier to log and to process. Sound waves, radiation, or other signal carriers that carry information about the condition of the rolls are all included within the concept of 'diagnostic signal'.

The conveyor belts are typically endless belts that are stretched between two head drums and supported by way of powered or unpowered rolls. The upper rolls carry the load of the conveyor belt as well as that of the materials transported on it. The lower rolls, on the other hand, carry only the conveyor belt itself, and prevent it from sagging. The conveyor belt system according to the invention may feature diagnostic windows on one side of the conveyor belt with a height that suffices for monitoring the lower as well as the upper rolls. The conveyor belt system may also feature two diagnostic windows arranged above each other on one side of the conveyor belt, such that lower diagnostic windows allow for monitoring the lower rolls, and the upper diagnostic windows correspondingly allow for monitoring the upper rolls. Both sides of the conveyor belt system may be equipped with diagnostic windows, such that the rolls can be monitored over short distances, preferentially during ongoing operations of the conveyor belt system.

The conveyor belt system may feature at least one series of diagnostic windows extending along the length of the conveyor belt. Due to the serial arrangement of the individual diagnostic windows, all rolls are equally well accessible for monitoring. The series may extend along the conveyor belt system and allow for a view of the upper rolls as well as of the lower rolls. Alternatively, the conveyor belt system may also have two or more than two series of diagnostic windows on one or on both sides. The diagnostic windows may be designed for optical and/or acoustic monitoring of the rolls and of Its bearings when the enclosure is closed. In other words, the windows may be transparent to the measurement signal or the diagnostic signal, for instance, to sound waves or to infrared or heat radiation emitted by the bearings of the rolls. In one exemplary embodiment, the diagnostic windows respectively feature a grid element mounted in a window frame, such that the grid element is capable of transmitting acoustic information and/or features sufficiently large apertures for allowing temperature measurements of the rolls by means of an infrared thermometer or a thermal imaging camera through the grid element. On the one hand, the grid element offers sufficient protection against injuries caused by the moving parts of the conveyor belt system, whereas on the other hand, the grid element may feature such apertures between the rods of the grid that monitoring the rolls by through the apertures is possible. The grid element has a greater permeability for dust than a closed casing element. However, due to the arrangement of the grid element underneath the conveyor belt there still is good protection against dust, since the transported material is not likely to be whirled up by wind.

According to one embodiment of the conveyor belt system according to the invention, the enclosure features lower diagnostic windows, upper diagnostic windows, and covering hoods, such that the lower diagnostic windows are arranged laterally near lower rolls, the upper diagnostic windows are arranged laterally near the upper rolls, and the covering hoods are arranged over the upper diagnostic windows. These enclosures use relatively small components, which are therefore easily manageable by only few maintenance staff. The upper diagnostic windows are effectively used not only as a lateral cover for the conveyor belt system, but also as supporting parts for the covering hoods arranged on top of them. Due to the overall low amount of material used, such an enclosure may be manufactured in a cost-effective manner. In such enclosures, the upper diagnostic windows may have a length corresponding to the distance of the upper roller brackets of the conveyor belt system, whereas the lower diagnostic windows may have a length corresponding to the distance s of the supports of the conveyor belt system. Therefore, supporting parts in the conveyor belt system can also be used for mounting the diagnostic windows. The roller brackets and the supports of the conveyor belt system thereby become a part of the enclosure, such that the other parts of the enclosure can be designed to have a smaller weight. The upper diagnostic windows can be embodied to support the covering hoods, and the covering hoods may have a smaller length than the upper diagnostic windows. For instance, the length of the covering hoods may be half of the length of the upper diagnostic windows, such that an upper diagnostic window can serve as a support for two adjacently arranged covering hoods. Covering hoods of smaller length are user-friendlier and may, for instance, be lifted by two persons. The upper diagnostic windows may lean against the upper roller brackets, the covering hoods may be placed on the upper diagnostic windows, and the upper diagnostic windows and the covering hoods may be connected with the upper roller brackets by means of tensioning ropes, such that the handles of the upper diagnostic windows and of the covering hoods may also serve for guiding the tensioning ropes. The covering hoods can therefore consist of simple and correspondingly cost-effective components. Additionally or alternatively, other mounting aids can be used, such as fish plates, hole-pin pairs, tongue and groove connections, and or stacking elements.

The covering hoods may be formed or flexibly embodied such that they can be stacked on top of other covering hoods. In other words, the covering may have a form featuring a downward broadening opening width, such that multiple covering hoods can be stacked on top of each other. However, the covering hoods, in a mounted state, may also have vertical side walls and such flexibility that an elastic curvature of the covering hoods allows for stacking despite identical layout dimensions.

Stackability is not only an advantage for the initial delivery of the conveyor belt system, but also for maintenance work. Any removed covering hoods can be stacked on top of adjacent covering hoods in a space-saving manner.

Instead of a grid element, the diagnostic window may feature a foil incorporated in a window frame. The foil sheet or the sheet may be so thin that measurements through it are possible, for instance acoustic measurements. Alternatively, the foil may be attached on one side, and it may be folded back for diagnostic purposes. The windows may also feature a solid panel. Openable diagnostic windows may feature hinges or slide mechanisms. Locks or similar devices may be provided for protection against unauthorized opening.

In the conveyor belt system according to the invention, diagnostic windows may be arranged on both sides of the conveyor belt, and the diagnostic windows may be mounted at a level essentially corresponding to the mounting height of the rolls. When the conveyor belt system features diagnostic windows on both its sides in a longitudinal direction, there are short distances between the rolls to be examined and the diagnostic windows. At many locations at which a conveyor belt system is used, only one side of it is accessible for maintenance work. In such conveyor belt systems, a merely one-sided arrangement of diagnostic windows of a sufficient size for monitoring all the mounted rolls may be provided.

The diagnostic windows may feature locking elements that are openable by a diagnostic unit in the course of a diagnostic procedure. For the monitoring of the rolls, diagnostic units can be provided as technical aids, up to fully automated solutions. Such aids, for instance in the form of service vehicles that can be driven along the conveyor belt system may feature special equipment for interacting with respective locking elements on the diagnostic windows of the conveyor belt system.

Accordingly, the task of the present invention is also solved by a system for monitoring rolls in a conveyor belt system according to the invention with an enclosure for the conveyor belt system in which the system further features an diagnostic unit with a measuring instrument for detecting defective rolls, and the diagnostic unit for monitoring the rolls may either open the diagnostic windows after the unlocking of locking elements or may monitor the rolls through the closed diagnostic windows. The present invention is therefore not only limited to the conveyor belt system itself, but it also relates to the accessories of the conveyor belt system, specifically to a diagnostic unit for monitoring the conveyor belt system.

The present invention and embodiment options were described in a succinct manner. Apart from the concretely phrased combinations, the present disclosure also comprises additional combinations of characteristics that were not explicitly specified, within the discretion of the responsible person skilled in the art. Combinations of characteristics that happen to be mentioned consecutively should not be understood as mandatory combinations.

Figure 2:
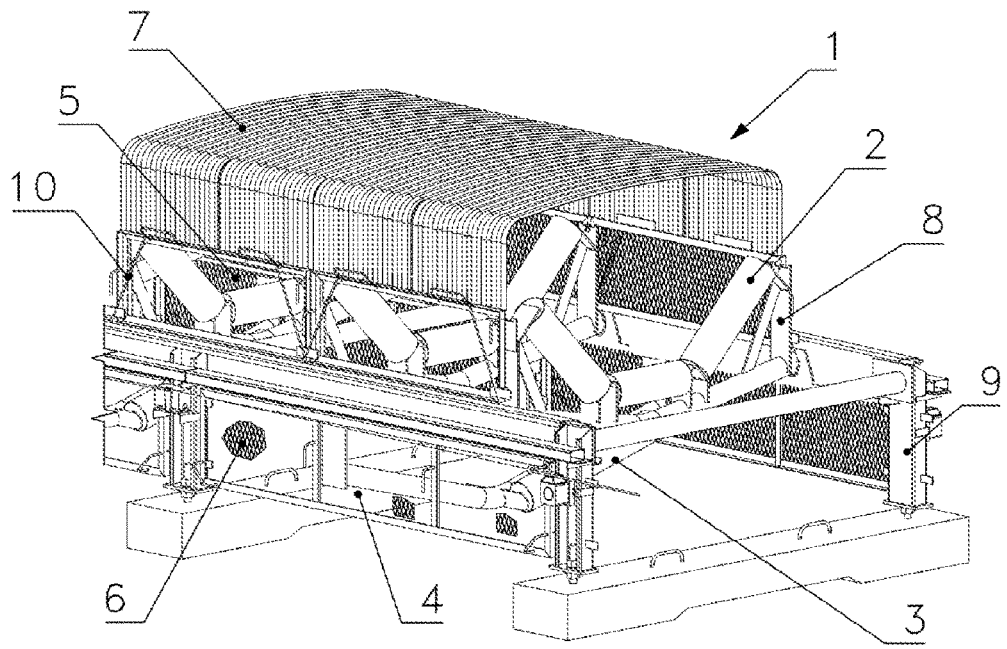

The present invention will be further explained based on of figures below, of which FIG. 1 shows a conveyor belt system in a perspectival overview, and FIG. 2 shows a perspectival detail enlargement.

FIG. 1 shows schematically a perspective view of a detail of an exemplary embodiment of a conveyor belt system 1 according to the invention. The endless conveyor belt (not shown) in the conveyor belt system 1 is for the transportation of a dry bulk, such as ore or coal. The transported dry bulk lies on the upper surface of the conveyor belt, the conveyor belt being trough-shaped concavely in order not to lose transported material over the edges of the conveyor belt. Upper rolls 2, which support the upper half of the conveyor belt, are rotatably attached to roller brackets 8. The illustrated middle upper roll 2 is aligned horizontally, whereas the side upper rolls 2 are aligned diagonally upward toward the edge of the conveyor belt. In the lower part of the conveyor belt system 1, an empty section of the conveyor belt is moved backward due to the circulatory movement of the conveyor belt. In order to avoid the sagging of the conveyor belt over long conveyor belt lengths of sometimes several hundreds of meters, the conveyor belt is supported by lower rolls 3.

The conveyor belt system 1 comprises an enclosure. According to the invention, the enclosure features diagnostic windows 4, 5 designed for optical and or acoustic monitoring of the rolls and their bearings. In the present exemplary embodiment, both the lower diagnostic windows 4 that are arranged laterally near the lower rolls 3 and the upper diagnostic windows 5 that are arranged laterally near the upper rolls 2 feature partially open grid elements 6. The grid elements 6 offer sufficient mechanical protection against injury of persons or animals at the conveyor belt system. In the illustrations of FIGS. 1 and 2, the grid elements 6 on the front face are mostly cut away, and they are only shown in small surface areas. As a result, the transparency of the diagnostic windows 4, 5 for inspection purposes is shown. In the rear diagnostic windows 4, 5, on the other hand, the grid elements 6 are shown in full. Towards the top, the enclosure in the illustrated exemplary embodiment is completed by covering hoods 7. In the illustrated exemplary embodiment, the covering hoods 7 consist mostly of corrugated iron. As can be seen in FIG. 1, the room above the upper rolls 3 or above the conveyor belt is essentially closed, such that rain and wind are largely kept out of the transportation space above the conveyor belt. Portions underneath the conveyor belt, on the other hand, are closed off by diagnostic windows 4, 5, which are transparent at least for monitoring or inspection measurements. Acoustic and optical monitoring of the rolls is possible through the diagnostic windows without a need for opening or removing the windows.

The proposed enclosure can be quickly and easily partially disassembled for the purpose of maintenance work. For these purposes, the covering hoods can be lifted by their handles and stacked on adjacent covering hoods. The diagnostic windows can be removed by one or two persons and set aside.

FIG. 2 shows an enlarged detail of the conveyor belt system 1 of FIG. 1. Apart from the elements already described with respect to FIG. 1, FIG. 2 clearly shows the roller brackets 8 against which the upper diagnostic windows 5 are leaning behind respective fish plates. The lower diagnostic windows 4, on the other hand, are attached to the supports 9 of the conveyor belt system 1. Each of the upper diagnostic windows 5 comprises a respective window frame, which serves simultaneously as a supporting part for the assembly of the covering hoods 7. The exact position of the covering hoods 7 is secured by way of guide pins, which reach into respective holes in the diagnostic windows 5. The assembly positions of the upper diagnostic windows 5 and of the covering hoods 7 are fixated in the present exemplary embodiment by means of tensioning ropes 10, which is necessary in order to cope with wind forces. Protection against unauthorized access is provided by locks (not shown) on the tensioning ropes 10. Handles on the covering hoods 7 serve simultaneously as guides for the tensioning ropes 10.

The specified exemplary embodiment serves for the purpose of explanation, and not for defining the scope of protection of the invention. The scope of protection of the invention is determined by the patent claims, the totality of the description, and the figures.

REFERENCE NUMBERS 1 conveyor belt system
2 upper rolls
3 lower rolls
4 lower diagnostic window
5 upper diagnostic window
6 grid element
7 covering hood
8 roller bracket
9 support
10 tensioning rope

The invention claimed is:

1. A conveyor belt system (1) with a circulating conveyor belt, in which a loadable conveyor belt segment is supported on upper rolls (2) and an unloaded conveyor belt segment is supported on lower rolls (3), and in which an enclosure extends along the longitudinal axis of the conveyor belt system (1), characterized in that the enclosure features on at least one side of the conveyor belt, lower diagnostic windows (4), upper diagnostic windows (5), and covering hoods (7), such that the lower diagnostic windows (4) are arranged laterally next to the lower rolls (3), the upper diagnostic windows (5) are arranged laterally next to the upper rolls (2), and the covering hoods (7) are arranged on the upper diagnostic windows (5), and such that the upper diagnostic windows (5) and the lower diagnostic windows (4) are designed for optical and/or acoustic monitoring of the bearings of the respective upper and lower rolls (2, 3), and such that the upper and lower diagnostic windows (5, 4) are either transparent to a diagnostic signal or easily openable, and such that the upper and lower diagnostic windows (5, 4) extend along a row.

2. A conveyor belt system (1) according to claim 1, characterized in that the upper and lower diagnostic windows (5, 4) are designed for optical and/or acoustic monitoring of their respective upper and lower rolls (2, 3) and of their respective bearings when the enclosure is closed.

3. A conveyor belt system (1) with a circulating conveyor belt, in which a loadable conveyor belt segment is supported on upper rolls (2) and an unloaded conveyor belt segment is supported on lower rolls (3), and in which an enclosure extends along the longitudinal axis of the conveyor belt system (1), characterized in that the enclosure features upper and lower diagnostic windows (5, 4) on at least one side of the conveyor belt, such that the upper and lower diagnostic windows (5, 4) are arranged at the level of their respective upper and lower rolls (2, 3) of the conveyor belt and are designed for optical and/or acoustic monitoring of the bearings of their respective upper and lower rolls (2, 3), the upper and lower diagnostic windows (5, 4) being either transparent to a diagnostic signal or easily openable, and such that the upper and lower diagnostic windows (5, 4) extend along a row, and characterized in that the upper and lower diagnostic windows (5, 4) respectively feature a grid element (6) mounted in a window frame, such that the grid element is acoustically transmittive and/or features sufficiently large apertures for performing a temperature measurement of the upper and lower rolls (2, 3) through the grid element (6) by means of an infrared thermometer or with a thermal imaging camera.

4. A conveyor belt system (1) according to claim 1, characterized in that the upper diagnostic windows (5) have a length corresponding to the distance of upper roller brackets (8) of the conveyor belt system and the lower diagnostic windows (4) have a length corresponding to the distance of the supports (9) of the conveyor belt system (1).

5. A conveyor belt system (1) according to claim 4, characterized in that the upper diagnostic windows (5) are designed to support the covering hoods (7), such that the covering hoods (7) may have a shorter length than the upper diagnostic windows (5).

6. A conveyor belt system (1) according to claim 5, characterized in that the upper diagnostic windows (5) lean against the upper roller brackets (8), the covering hoods (7) are positioned above the upper diagnostic windows (5), and the upper diagnostic windows (5) and the covering hoods (7) are connected to the upper roller brackets (8) by means of tensioning ropes (10), such that the handles (11) of the upper diagnostic windows (5) and of the covering hoods (7) may also serve for guiding the tensioning ropes (10).

7. A conveyor belt system (1) according to claim 1, characterized in that the covering hoods (7) are formed or flexibly designed such that they can be stacked on other covering hoods (7).

8. A conveyor belt system (1) according to claim 1, characterized in that the upper and lower diagnostic windows (5, 4) feature a foil mounted in a window frame.

9. A conveyor belt system (1) according to claim 1, characterized in that the upper and lower diagnostic windows (5, 4) are arranged on both sides of the conveyor belt system (1) and in that the upper and lower diagnostic windows (5, 4) are mounted at a level essentially corresponding to the mounting height of the respective upper and lower rolls (2, 3).

10. A conveyor belt system (1) according to claim 1, characterized in that the upper and lower diagnostic windows (5, 4) feature locking elements that can be opened by a diagnostic unit in the course of a diagnostic procedure.

11. A system for the monitoring of upper and lower rolls (2, 3) in a conveyor belt system (1) according to claim 1 with an enclosure of the conveyor belt system (1), in which the system further comprises a diagnostic unit with a measuring instrument for detecting defective rolls, and the diagnostic unit for the monitoring of the upper and lower rolls (2, 3) is either capable of opening the upper and lower diagnostic windows (5, 4) after unlocking the locking elements, or alternatively, capable of monitoring the upper and lower rolls (2, 3) through the respective closed upper and lower diagnostic windows (5, 4).

12. A conveyor belt system (1) according to claim 3, characterized in that the upper and lower diagnostic windows (5, 4) are designed for optical and/or acoustic monitoring of their respective upper and lower rolls (2, 3) and of their respective bearings when the enclosure is closed.

13. A conveyor belt system (1) according to claim 3, characterized in that the covering hoods (7) are formed or flexibly designed such that they can be stacked on other covering hoods (7).

14. A conveyor belt system (1) according to claim 3, characterized in that the upper and lower diagnostic windows (5, 4) feature a foil mounted in a window frame.

15. A conveyor belt system (1) according to claim 3, characterized in that the upper and lower diagnostic windows (5, 4) are arranged on both sides of the conveyor belt system (1) and in that the upper and lower diagnostic windows (5, 4) are mounted at a level essentially corresponding to the mounting height of the respective upper and lower rolls (2, 3).

16. A conveyor belt system (1) according to claim 3, characterized in that the upper and lower diagnostic windows (5, 4) feature locking elements that can be opened by a diagnostic unit in the course of a diagnostic procedure.

17. A system for the monitoring of upper and lower rolls (2, 3) in a conveyor belt system (1) according to claim 3 with an enclosure of the conveyor belt system (1), in which the system further comprises a diagnostic unit with a measuring instrument for detecting defective rolls, and the diagnostic unit for the monitoring of the upper and lower rolls (2, 3) is either capable of opening the upper and lower diagnostic windows (5, 4) after unlocking the locking elements, or alternatively, capable of monitoring the upper and lower rolls (2, 3) through the respective closed upper and lower diagnostic windows (5, 4).

18. A system for the monitoring of upper and lower rolls (2, 3) in a conveyor belt system (1),
said conveyor belt system (1) having a circulating conveyor belt, in which a loadable conveyor belt segment is supported on upper rolls (2) and an unloaded conveyor belt segment is supported on lower rolls (3), and in which an enclosure extends along the longitudinal axis of the conveyor belt system (1), characterized in that the enclosure features at least one diagnostic window on one side of the conveyor belt, said at least one diagnostic window having a height that suffices for monitoring both the upper and lower rolls (2, 3), said at least one diagnostic window being designed for optical and/or acoustic monitoring of the bearings of the upper and lower rolls (2, 3), said at least one diagnostic window being either transparent to a diagnostic signal or easily openable, and said at least one diagnostic window extending along a row,
in which the system further comprises a diagnostic unit with a measuring instrument for detecting defective rolls, and the diagnostic unit for the monitoring of the upper and lower rolls (2, 3) is either capable of opening said at least one diagnostic window after unlocking the locking elements, or alternatively, capable of monitoring the upper and lower rolls (2, 3) through the at least one diagnostic window when closed.

\* \* \* \* \*